(12) United States Patent
Jaenker et al.

(10) Patent No.: US 8,152,465 B2
(45) Date of Patent: Apr. 10, 2012

(54) ROTOR BLADE FOR A ROTOR AIRPLANE

(75) Inventors: Peter Jaenker, Riemerling (DE);
Valentin Kloeppel, Munich (DE)

(73) Assignee: Eurocopter Deutschland GmbH,
Donauwoerth (DE)

( * ) Notice: Subject to any disclaimer, the term of this patent is extended or adjusted under 35 U.S.C. 154(b) by 693 days.

(21) Appl. No.: 12/339,679

(22) Filed: Dec. 19, 2008

(65) Prior Publication Data

US 2009/0169381 A1    Jul. 2, 2009

(30) Foreign Application Priority Data

Dec. 20, 2007  (DE) .......................... 10 2007 062 490

(51) Int. Cl.
*B64C 9/00*     (2006.01)
*B64C 11/28*    (2006.01)

(52) U.S. Cl. ....... 416/23; 416/240; 416/241 R; 244/215; 244/199.4; 244/17.25

(58) Field of Classification Search ................. 416/23, 416/240, 241 R; 244/215, 199.4, 17.25
See application file for complete search history.

(56) References Cited

U.S. PATENT DOCUMENTS

| 4,324,530 | A  | * | 4/1982 | Fradenburgh et al. ........ 416/228 |
| 6,394,397 | B1 |   | 5/2002 | Ngo et al. |
| 6,461,106 | B1 |   | 10/2002 | Rahier et al. |
| 2002/0066831 | A1 | * | 6/2002 | Ngo et al. ..................... 244/199 |

* cited by examiner

*Primary Examiner* — Michelle Mandala
*Assistant Examiner* — Aaron Dehne
(74) *Attorney, Agent, or Firm* — Brooks Kushman P.C.

(57) ABSTRACT

A rotor blade comprises an inner rotor blade root area, a rotor blade main area disposed adjacent to the inner rotor blade root area along a length of the rotor blade and having an aerodynamically effective rotor blade profile, the profile including a nose area and a rear edge area, and a rotor blade tip disposed adjacent to the rotor blade main area along the length of the rotor blade. The rotor blade tip is configured to be deformable relative to the rotor blade main area and is operatively connected to a first actuator device. The first actuator device is configured to initiate a vertical movement of the rotor blade tip upwards or downwards relative to the lift direction. The vertical movement starts from a neutral position relative to the rotor blade main area.

10 Claims, 3 Drawing Sheets

Conventional Blade Camber

Nose Droop

S - Curve

ROTOR BLADE FOR A ROTOR AIRPLANE

Priority is claimed to German Patent Application No. 10 2007 062 490.7-22, filed on Dec. 20, 2007, the entire disclosure of which is incorporated by reference herein.

The present invention relates to a rotor blade, especially for a rotorcraft.

BACKGROUND

The rotor blades of a rotorcraft are subject to air vortices during operation. These give rise to noise and vibrations that stand in the way of the acceptance of rotorcraft by the general public. Moreover, such vibrations are disadvantageous in terms of service life and maintenance since they can lead to material fatigue of the parts and to constant relative movements of the parts, with the resultant wear and tear.

The aero-mechanical and aero-elastic phenomena—for instance, the collision of a rotor blade with blade vortices coming from the preceding rotor blade and the resulting forces that act upon the rotor blade—that can be observed during the landing approach at certain angles of descent of the rotorcraft cause vibrations and lead to intermittent noise patterns.

It is likewise known that the approach stream conditions acting on a rotor of a rotorcraft change constantly, even in the stationary flight state. These changes result from the overlapping of the forward speed of the rotorcraft with the rotational speed of the rotor.

This superimposition essentially gives rise to two extreme approach stream situations, namely, at the forward blade and at the aft blade. At the forward blade, the rotational component is positively superimposed on the translational component and this leads to an approach stream having a highly transonic characteristic at the tip of the blade. In this case, the thinnest possible profile with little curvature is desired in order to avoid strong supersonic bangs. At the aft blade, the translational component of the forward airspeed is subtracted from the rotational component. This results in a great reduction in the local approach stream velocity, even causing the approach stream to strike the profile from the rear in the inner area of the blade. In conjunction with the high angle of incidence of the blade that prevails in the aft blade area, the low relative approach stream velocity causes stalling of the flow, which has a negative effect on the dynamic push-pull rod loads and on the power requirements of the rotor. A thicker profile or a profile with a pronounced curvature would be advantageous in this area.

SUMMARY OF THE INVENTION

An aspect of the present invention is to provide a rotor blade, especially for a rotorcraft, that has a simple, homogeneous structure and that displays favorable aerodynamic properties.

According to the invention, the rotor blade comprises an inner rotor blade root area, as seen in the lengthwise direction of the blade, and a rotor blade main area following the rotor blade root area, also seen in the lengthwise direction of the blade, said rotor blade main area having an aerodynamically effective rotor blade profile with a nose area and with a rear edge area, further comprising a rotor blade tip following the rotor blade main area, as seen in the lengthwise direction of the blade. The geometry of the rotor blade tip is configured so as to be dynamically deformable.

According to a particularly advantageous embodiment of the invention, the rotor blade tip in and of itself is configured so as to be actively flexurally elastic and reversibly deformable. Relative to a rotor blade profile—which is located furthest to the outside, as seen in the lengthwise direction of the blade—of the aerodynamically effective rotor blade main area, which will be referred to below as the reference profile, the profiles of the rotor blade tip have a considerably thinner profile $D_{spitze}$. This rotor blade tip, which is configured so as to be actively flexurally elastic and reversibly deformable as well as thin relative to the rotor blade main area is operatively connected to a second actuator device by means of which a torsion of the rotor blade tip and/or a lowering of a nose area of the rotor blade tip and/or a curving of the rotor blade tip profile and/or a formation of an S-twist of the rotor blade tip profile or else the above-mentioned deformations/movements can be initiated and vice versa.

Thanks to this inventive repeated and systematic deformation of the rotor blade tip during one rotation of the rotor blade, the following can be advantageously achieved:

a reduction in the compressibility effects by a blade tip that is thin and not curved in the front area, a delay in the stalling of the flow by a lowering of the profile nose (nose droop), or a curving of the profile in the aft blade area, as well as a reduction in noise, vibrations, dynamic loads and blade instabilities, etc. by a high-frequency variation of the profile S-twist as well as of the blade tip torsion.

As has been demonstrated in experiments, the best results are obtained when the profile of the rotor blade tip has a thickness ratio $D_{Spitze}/D_{Ref}$ of 0.7 to 0.5, relative to the profile thickness $D_{Ref}$ of the reference profile.

Preferably, in at least one place, the rotor blade tip, as seen in the lengthwise direction of the blade, has a profile depth $T_{Spitze}$, that is enlarged relative to the reference profile and that extends beyond the profile nose and the profile rear edge of the aerodynamically effective rotor blade profile of the rotor blade main area. This "paddle-like" shape of the blade tip that widens towards the front and back has proven to be advantageous since, as a result, a nose lead is superfluous, in addition to which the control effect of the blade tip can be increased.

In order to ensure the desired increase in the control effect of the blade tip, the profile of the rotor blade tip has a depth ratio $T_{Spitze}/T_{Ref}$ of 2 to 1.2, relative to the profile depth $T_{Ref}$ of the reference profile.

According to an especially advantageous embodiment of the invention, the actuator device has at least two plate-shaped actuators that can be lengthened and/or shortened in the plane of the plate, one of said actuators being arranged on the top and one on the bottom of the rotor blade tip, as seen in the direction of lift. The actuators are attached, for example, by being glued on. However, it is also possible to employ mechanical attachment means such as, for instance, clamping or screwing elements. In addition, the top or bottom of the rotor blade tip fitted with the actuators can be provided with a protective layer to safeguard the actuators against impact, pressure, tensile forces or other external influences, including environmental effects such as moisture, dust, lightning, etc.

According to another embodiment of the invention, the first and/or second actuator device has at least two plate-shaped actuators that can be lengthened and/or shortened in the plane of the plate and that are integrated into the rotor blade tip. This configuration is preferred in so-called composite structures that can be metallic in nature or else in so-called MMCs (metal matrix composites). By the same token, the actuators can be integrated into the fiber composite structures, for instance, by means of lamination. An advantage in this case is that the actuators are automatically protected.

Preferably, the at least two plate-shaped actuators are configured as plate-shaped piezoelectric actuators. The configuration of the actuators as piezoelectric actuators has proven to be particularly advantageous because this ensures an effective application of forces into the blade tip while also being very sturdy and compact in size.

Preferably, the at least two plate-shaped actuators of the actuator device have effective directions that intersect each other and are opposite from each other when the rotor blade is seen in a top view. Owing to this arrangement of the effective actuator direction, which is slanted relative to the lengthwise direction of the blade, a torsion/twist of the blade tip can be achieved in a simple manner by means of an actuator expansion that is opposite on the top and bottom.

Here, the at least two plate-shaped actuators of the actuator device are preferably arranged over the entire surface on or in the rotor blade tip. This continuous arrangement of the actuators, distributed over the entire rotor blade tip, has proven to be particularly advantageous since, in a simple manner, this ensures a maximal influence of the curvature, torsion and S-twist.

Further advantages, features and application possibilities of the present invention ensue from the description below in conjunction with the embodiment shown in the drawing.

The invention will be described in greater detail below, making reference to the embodiment depicted in the drawing.

BRIEF DESCRIPTION OF THE DRAWINGS

In the description, in the claims, in the abstract as well as in the drawing, the terms and associated reference numerals employed are those indicated in the list of reference numerals presented below.

The drawings show the following.

DETAILED DESCRIPTION

Figure 1:
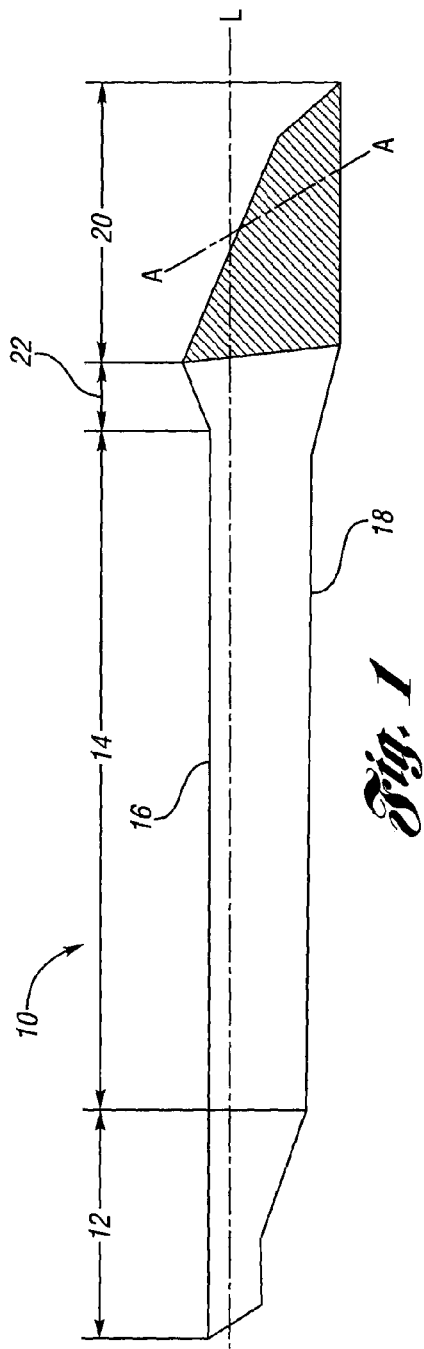
FIG. 1—a simplified depiction of a rotor blade according to the invention.

In the following description and in the figures, for purposes of avoiding repetition, the same parts and components are designated with the same reference numerals, insofar as no additional differentiation is necessary or practical.

The rotor blade shown more or less schematically in FIG. 1 in a simplified depiction and designated in its entirety by the reference numeral 10 comprises an inner rotor blade root area 12, as seen in the blade lengthwise direction L, having a blade connection without links and bearings, it comprises a rotor blade main area 14 following the rotor blade root area 12, as seen in the blade lengthwise direction L, having an aerodynamically effective rotor blade profile with a nose area 16 and with a rear edge area 18, and it comprises a rotor blade tip 20 following the rotor blade main area 14, as seen in the blade lengthwise direction L.

The rotor blade tip 20 is configured here so as to be deformable relative to the rotor blade main area 14. A flexurally elastic and reversibly deformable transition area 22 is situated between the rotor blade main area 14 and the rotor blade tip 20.

Furthermore, in at least one place, the rotor blade tip 20 has a profile depth that is enlarged relative to the aerodynamically effective rotor blade profile of the rotor blade main area 14, said profile depth extending beyond the profile nose 16 and the profile rear edge area 18 of the aerodynamically effective rotor blade profile of the rotor blade main area 14. The rotor blade tip 20 in and of itself is configured so as to be actively flexurally elastic and reversibly deformable, it has a considerably thinner profile relative to the aerodynamically effective rotor blade profile of the rotor blade main area 14 and it is operatively connected to a actuator device 24.

Figure 3:
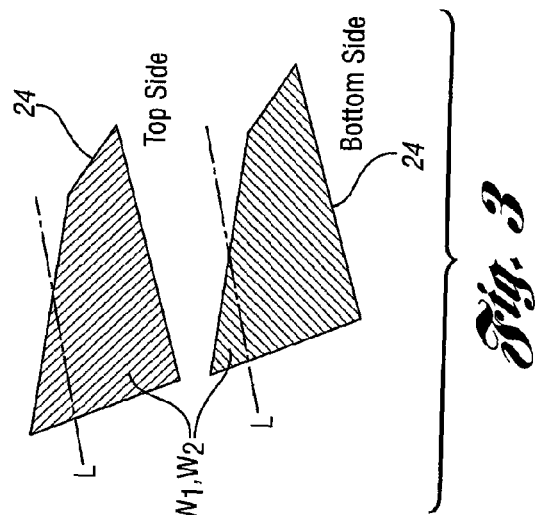
FIG. 3—a schematic detailed view of the rotor blade tip of the rotor blade from FIG. 1.
Figure 2:
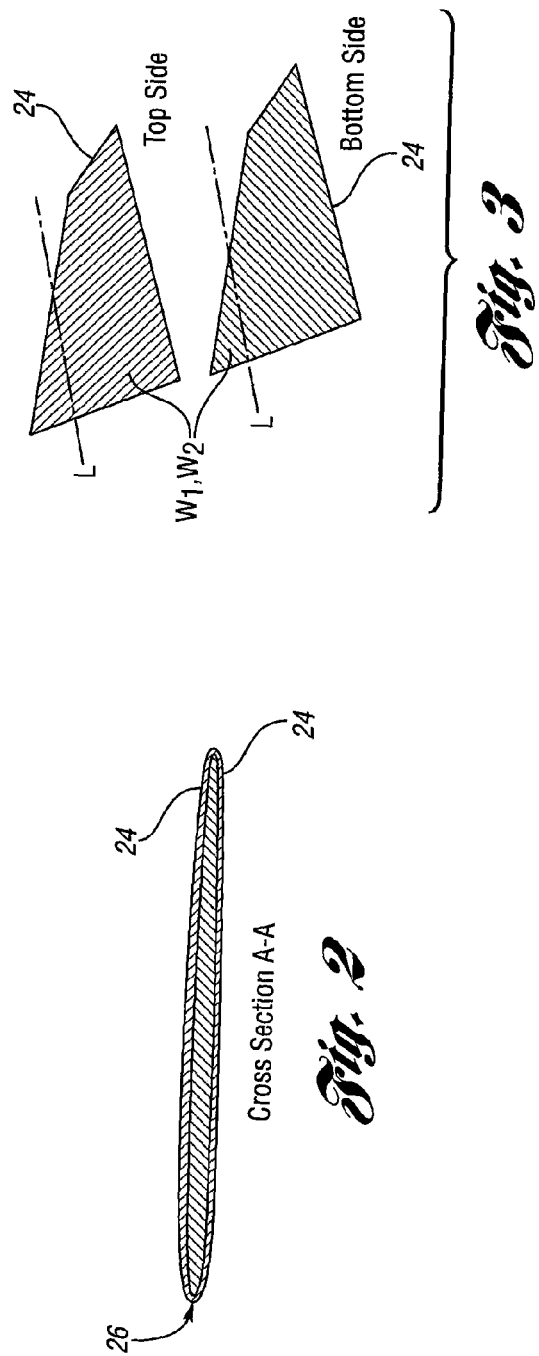
FIG. 2—a sectional view of the rotor blade from FIG. 1, along line A-A.

FIGS. 2 and 3 show the actuator device. It is configured in the form of a d33 actuator layer and is attached to the top or bottom of the profile by means of glue or a comparable joining means. The actuator layers 24 are distributed over the entire surface, i.e. continuously, over the entire rotor blade tip 20 and they are supplied with voltage through cables laid in the rotor blade 10.

FIG. 3 also shows that, on the top and bottom, the actuator layers 24 have an actuator effective direction $W_1$, $W_2$, which is slanted relative to the blade lengthwise direction L.

Owing to this special configuration of the rotor blade tip 20 and the arrangement of the actuator layers 24, by appropriately activating the actuator layers 24 on the top and bottom of the blade tip, that is to say, by systematically expanding or contracting the actuator layers 24, a torsion of the rotor blade tip 20 and/or a lowering of a nose area 26 of the rotor blade tip 20 and/or a curving of the rotor blade tip profile and/or a formation of an S-twist of the rotor blade tip profile can be initiated. All of the above-mentioned deformations or movements can also be initiated vice versa.

Figure 4:
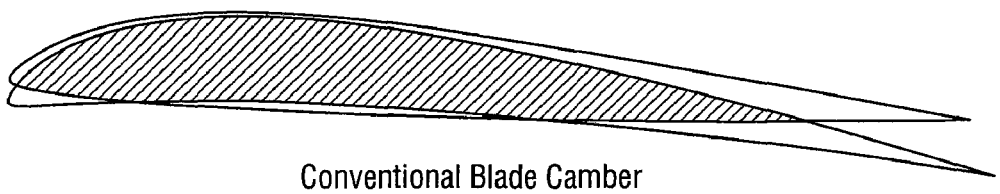
FIG. 4—a schematic depiction of the curvature variations as well as of the S-twist of the rotor blade tip.
Figure 4:
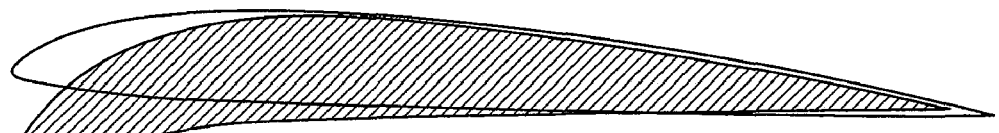
Figure 4:
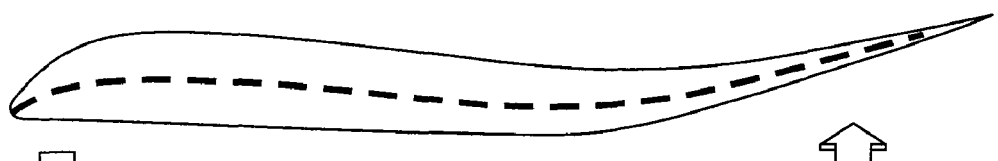
Figure 4:

Some of the curvature variations that can be thus achieved are schematically shown in FIG. 4.

The actuator layers 24 are used to change the curvature, the torsion and the S-twist of the blade tip 20 between 1 and 6 times per revolution as well as, if necessary, quasi-stationarily (slowly). The geometric changes take place in a closed control loop and lead to a decrease in compressibility effects, to a delay of the stalling of the flow, and to a reduction of noise, vibrations, dynamic loads and blade instabilities. Concurrently with compressibility effects (compression shocks) and a stalling of the flow, the power requirements of the rotor are reduced.

Figure 5:
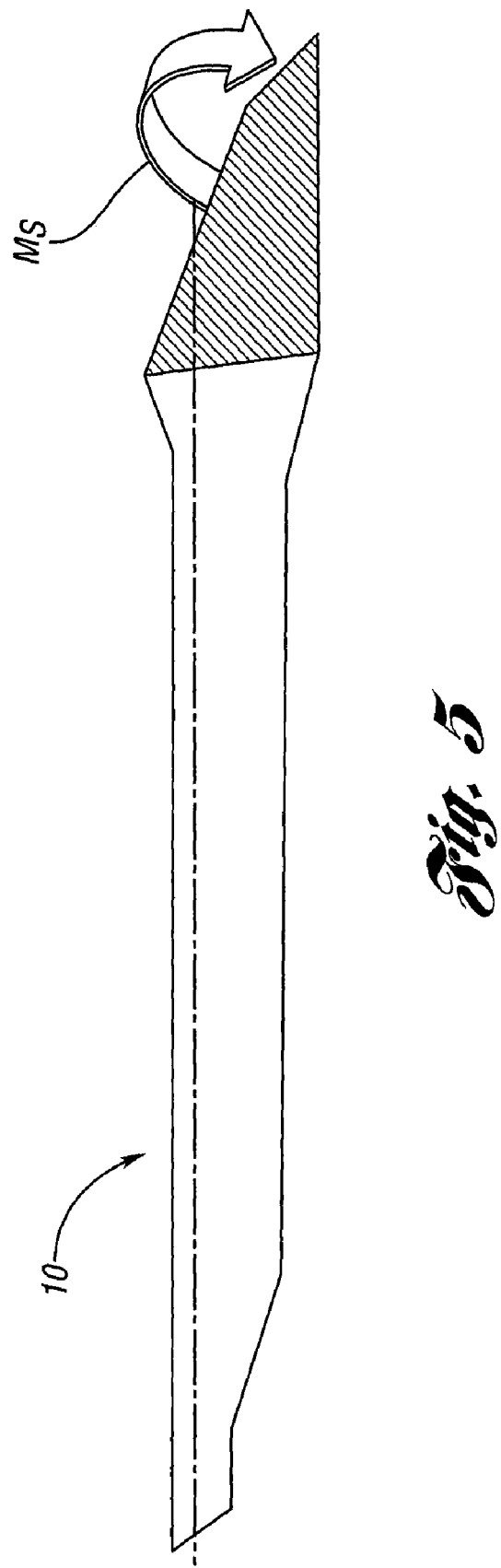
FIG. 5—a depiction of the control torque effect of the rotor blade according to the invention.

The systematic geometric influence exerted on the rotor blade tip 20 results in a servo control of the rotor blade 10, see FIG. 5. In other words, by means of the servo effect, the curvature, the torsion and the S-twist of the rotor blade tip 20 generate a low-frequency as well as a high-frequency servo control torque $M_S$ around the blade lengthwise direction L and bring about a change in the angle of incidence of the blade. The low-frequency change in the angle of incidence serves for the primary control of a torsionally soft blade, without a need for mechanical or hydraulic control means. This torsional softness can be limited to the blade root area 12 or else it can additionally include the main area 14. The high-frequency variation reduces vibrations, noise, dynamic loads, unbalances, stalling of the flow, the power requirements by the rotor as well as blade instabilities.

LIST OF REFERENCE NUMERALS 10 rotor blade
12 rotor blade root area
14 rotor blade main area
16 nose area
18 rear edge area 20 rotor blade tip
22 transition area
24 actuator layer
26 nose area of the blade tip
L lengthwise direction of the blade
A direction of lift
$W_1$, $W_2$ actuator effective direction
$M_S$ servo control torque

The invention claimed is:

1. A rotor blade comprising:
   an inner rotor blade root area;
   a rotor blade main area disposed adjacent to the inner rotor blade root area along a length of the rotor blade and having an aerodynamically effective rotor blade profile, the profile including a leading edge area and a rear edge area; and
   a rotor blade tip disposed adjacent to the rotor blade main area along the length of the rotor blade, wherein the rotor blade tip is configured to be deformable relative to the rotor blade main area and is disposed furthest to the outside of the aerodynamically effective rotor blade main area along the rotor blade and has a rotor blade tip profile having a tip profile thickness $D_{spitze}$ and a nose area, wherein the rotor blade tip profile is thinner than the rotor blade profile, the rotor blade tip configured to be actively flexurally elastic and reversibly deformable and being operatively connected to an actuator device wherein the actuator device is configured to initiate at least one of a torsion of the rotor blade tip, a curving of the rotor blade tip profile, and a formation of an S-twist of the rotor blade tip profile.

2. The rotor blade as recited in claim 1, wherein relative to a profile thickness $D_{Ref}$ of the rotor blade profile, the rotor blade tip profile has a thickness ratio of $D_{spitze}/D_{Ref}$ of 0.7 to 0.5.

3. The rotor blade as recited in claim 1, wherein the rotor blade tip has a tip profile depth $T_{spitze}$ in at least one place along the length of the blade enlarged relative to the rotor blade profile and extending beyond the profile nose and the profile rear edge of the aerodynamically effective rotor blade profile of the rotor blade main area.

4. The rotor blade as recited in claim 3, wherein the rotor blade tip profile has a depth ratio of $T_{spitze}/T_{Ref}$ of 2 to 1.2, relative to a profile depth $T_{Ref}$ of the rotor blade profile.

5. The rotor blade as recited in claim 1, wherein the actuator device has at least two plate-shaped actuators configured to be at least one of lengthened and shortened in a plane of the at least two plate-shaped actuators, the actuators forming part of the rotor blade tip profile, one of the at least two plate-shaped actuators disposed on a top side of the rotor blade tip and one of the at least two plate-shaped actuators disposed on a bottom side of the rotor blade tip.

6. The rotor blade as recited in claim 1, wherein the actuator device includes at least two plate-shaped actuators configured to be at least one of lengthened and shortened in the plane of the plate-shaped actuator and integrated into the rotor blade tip profile.

7. The rotor blade as recited in claim 5, wherein the at least two plate-shaped actuators are configured as plate-shaped piezoelectric actuators.

8. The rotor blade as recited in claim 5, wherein the at least two plate-shaped actuators have effective directions intersecting each other and opposite each other as seen in a top view.

9. The rotor blade as recited in claim 5, wherein the at least two plate-shaped actuators are disposed over an entire surface on the rotor blade tip or in the rotor blade tip.

10. The rotor blade as recited in claim 5, wherein the rotor blade is an integral part of the rotor of a rotorcraft.

* * * * *